D. J. DEMAS.
TIRE CASING OR SHOE.
APPLICATION FILED JULY 13, 1916.
1,228,001.
Patented May 29, 1917.
2 SHEETS—SHEET 1.
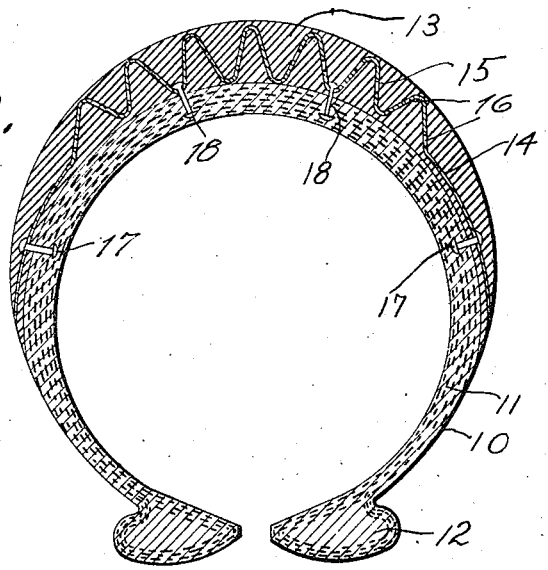
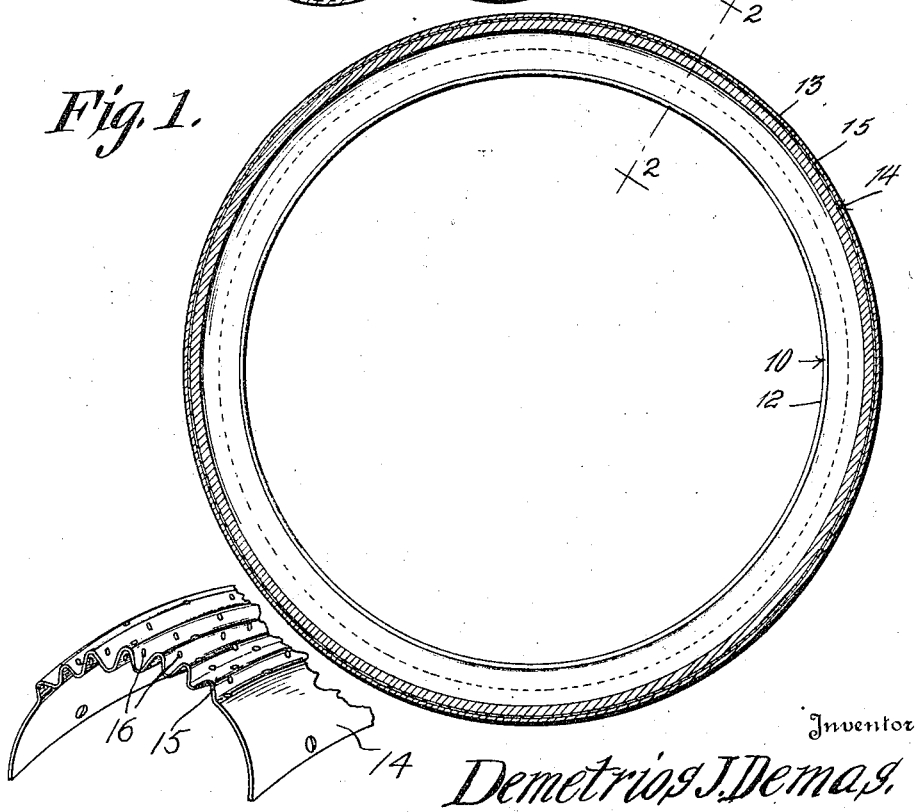
Inventor
Demetrios J. Demas.

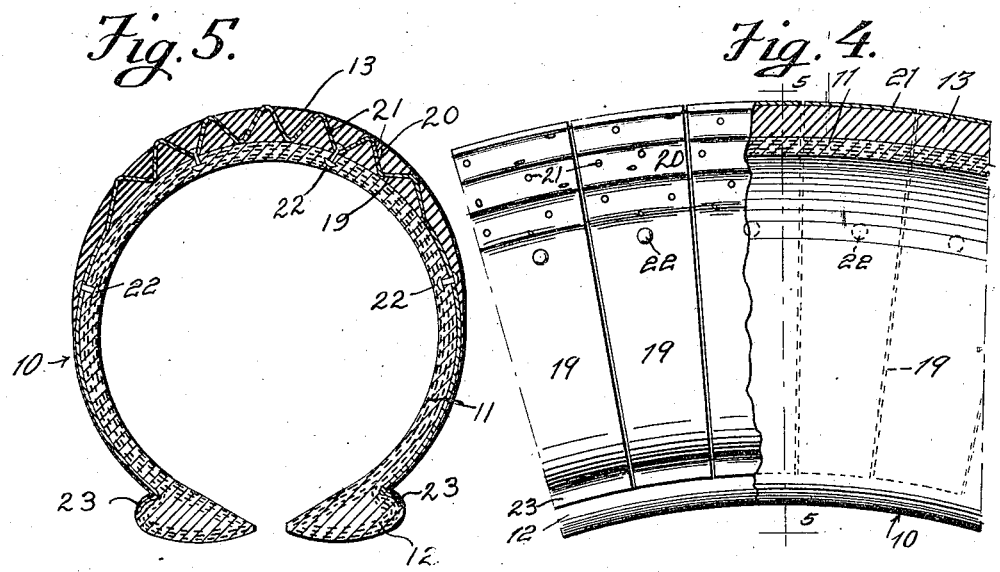

UNITED STATES PATENT OFFICE.

DEMETRIOS J. DEMAS, OF PITTSBURGH, PENNSYLVANIA.

TIRE CASING OR SHOE.

1,228,001.   Specification of Letters Patent.   Patented May 29, 1917.

Application filed July 13, 1916. Serial No. 109,099.

*To all whom it may concern:*

Be it known that I, DEMETRIOS J. DEMAS, citizen of the United States, residing at Pittsburgh, in the county of Allegheny and State of Pennsylvania, have invented certain new and useful Improvements in Tire Casings or Shoes, of which the following is a specification.

My invention relates to improvements in tire casings or shoes, provided with preferably internal armors.

An important object of the invention is to provide a tire casing or shoe of the above mentioned character, which is puncture proof to the highest degree, strong, durable, and suitably light.

Other objects and advantages of the invention will be apparent during the course of the following description.

In the accompanying drawings forming a part of this specification and in which like numerals are employed to designate like parts throughout the same, Figure 1 is a section of a tire casing or shoe embodying my invention taken in the plane of rotation of the tire casing, Fig. 2 is a transverse sectional view through the same taken on line 2—2 of Fig. 1, Fig. 3 is a fragmentary perspective view of the internal armor, Fig. 4 is a fragmentary side elevation, parts removed, and parts in section, of a slightly different form of tire and casing, Fig. 5 is a transverse sectional view taken on line 5—5 of Fig. 4.

In the drawings, wherein for the purpose of illustration are shown preferred embodiments of my invention, attention being called first to Figs. 1 to 7 inclusive, the numeral 10 designates the tire casing or shoe, formed of layers of canvas or fabric 11, impregnated with or covered by rubber and securely united. At its inner portion, the tire casing is provided with the usual beads 12. The tread portion of the tire casing is provided with a section of thick rubber 13.

In Figs. 1 to 3 inclusive, the numeral 14 designates a preferably metallic internal annular armor, which may be formed of suitably thin and flexible sheet metal. This armor is provided in its tread portion with corrugations or crimps 15 bent therein, which extend in the plane of rotation of the armor. The function of these corrugations is to improve the manner in which the armor is embodied in the rubber tread portion 13. The corrugations 15 are preferably apertured, as shown at 16, to permit of the passage of the rubber therethrough, when in the plastic state, during the molding of the casing. The armor 14 is secured to the fabric portion 11 by rivets 17 and 18, as shown. The annular armor 14 may be formed in one piece, or two or more pieces, as may be found advantageous.

In Figs. 4 and 5, I have shown a different form of the invention. In these figures, the numeral 19 designates relatively short armor plates, which are embedded in the rubber tread portions 13, as shown. These armor plates taper slightly toward their inner ends so that they may be arranged in edge to edge relation. The tread portion of each armor plate 19 is corrugated, as shown at 20, and these corrugations are provided with apertures 21, for the passage of the rubber. Each armor plate 19 is secured to the fabric portion 11 by means of rivets 22, as shown. The armor plates 19 extend inwardly past the section of rubber 13 and project exteriorly thereof and have their ends bent into curved portions 23, which are arranged upon the beads 12, as shown. The outer ends of the corrugations 20 project through the surface of the tread portion 13, to contact with the road-bed, and function as anti-skid means.

From the foregoing description it is apparent that I have provided a tire casing or shoe which is puncture proof, to the highest degree, highly flexible, strong and durable.

It is to be understood that the forms of my invention herewith shown and described are to be taken as preferred examples of the same, and that various changes in the shape, size, and arrangement of parts may be resorted to without departing from the spirit of the invention or the scope of the subjoined claim.

Having thus described my invention, I claim:

A tire casing containing rubber; and an internal metallic armor plate embedded therein, said plate having its tread portion bent into corrugations which extend in the plane of rotation of the casing, the corrugations being apertured for the passage of the rubber and having their crests extending to the tread surface of the casing to form longitudinally extending gripping portions to contact with the road-bed.

In testimony whereof I affix my signature in presence of two witnesses.

DEMETRIOS J. DEMAS.

Witnesses:
C. L. PARKER,
G. C. JARVIS.

Copies of this patent may be obtained for five cents each, by addressing the "Commissioner of Patents, Washington, D. C."